US012646894B2

(12) United States Patent
Ritter et al.

(10) Patent No.: US 12,646,894 B2
(45) Date of Patent: Jun. 2, 2026

(54) SHIELDING PLATE, AND PLUG CONNECTOR PART WITH SHIELDING PLATE

(71) Applicant: Phoenix Contact GmbH & Co. KG, Blomberg (DE)

(72) Inventors: Holger Ritter, Wumberg (DE); Alexander Hieber, Herrenberg-Kayh (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 313 days.

(21) Appl. No.: 18/555,258

(22) PCT Filed: Apr. 8, 2022

(86) PCT No.: PCT/EP2022/059370
§ 371 (c)(1),
(2) Date: Oct. 13, 2023

(87) PCT Pub. No.: WO2022/218840
PCT Pub. Date: Oct. 20, 2022

(65) Prior Publication Data

US 2024/0195129 A1 Jun. 13, 2024

(30) Foreign Application Priority Data

Apr. 15, 2021 (BE) .................................. 2021/5300

(51) Int. Cl.
*H01R 13/6587* (2011.01)
*H01R 12/71* (2011.01)

(52) U.S. Cl.
CPC ....... *H01R 13/6587* (2013.01); *H01R 12/712* (2013.01)

(58) Field of Classification Search
CPC .. H01R 12/712; H01R 12/91; H01R 13/6587; H01R 13/6594
See application file for complete search history.

(56) References Cited

U.S. PATENT DOCUMENTS 6,152,773 A * 11/2000 Chen .................. H01R 13/6594 439/607.01
6,227,904 B1 * 5/2001 Wang ................. H01R 13/6583 439/63

(Continued)

FOREIGN PATENT DOCUMENTS

EP 3389145 A1 10/2018
JP 2016062661 A 4/2016

(Continued)

*Primary Examiner* — Abdullah A Riyami
*Assistant Examiner* — Thang H Nguyen
(74) *Attorney, Agent, or Firm* — LEYDIG, VOIT & MAYER, LTD.

(57) ABSTRACT

A shielding plate through which a cylindrical insulating body of a plug connector part for installation on a circuit board is passable, the shielding plate including: an opening surrounding the insulating body, the shielding plate being resilient in a direction of an axis of the opening and having angled lugs at opposite edges. Each lug of the angled lugs has a first flank and a second flank adjoining the first flank, the first and second flanks each forming an oblique plane and, by way of a zigzag-shaped arrangement as seen in a side view, forming a detent edge which is situated between the first and second flanks and which faces inward toward an other lug.

10 Claims, 3 Drawing Sheets

(56) References Cited

U.S. PATENT DOCUMENTS

| | | | | |
|---|---|---|---|---|
| 2007/0054549 | A1 * | 3/2007 | Sofker ............... | H01R 13/6582<br>439/607.01 |
| 2024/0291210 | A1 * | 8/2024 | Hsu .................... | H01R 13/6273 |

FOREIGN PATENT DOCUMENTS

| | | | | | |
|---|---|---|---|---|---|
| KR | 102163379 | B1 | | 10/2020 | |
| WO | WO 2005036700 | A1 | | 4/2005 | |
| WO | WO 2019011372 | A1 | | 1/2019 | |
| WO | WO-2019011753 | A1 | * | 1/2019 | ........... H01R 13/746 |

* cited by examiner

SHIELDING PLATE, AND PLUG CONNECTOR PART WITH SHIELDING PLATE

CROSS-REFERENCE TO PRIOR APPLICATIONS

This application is a U.S. National Phase application under 35 U.S.C. § 371 of International Application No. PCT/EP2022/059370, filed on Apr. 8, 2022, and claims benefit to Belgian Patent Application No. BE 2021/5300, filed on Apr. 15, 2021. The International Application was published in German on Oct. 20, 2022 as WO/2022/218840 under PCT Article 21(2).

FIELD

The present invention relates to a shielding plate through which a cylindrical insulating body of a plug connector part for installation on a printed circuit board can be passed, the shielding plate having an opening surrounding the cylindrical insulating body, and the shielding plate being configured to be resilient in the direction of the axis of the opening and having angled lugs at opposite edges. The invention further relates to a plug connector part having such a shielding plate.

BACKGROUND

In the case of two-part device connectors for installation on a printed circuit board, the loop-through of the cable shield onto the printed circuit board generally takes place via multiple components (cable shield—knurled cable nut—housing socket/plug connector part—printed circuit board). The plug connector part is an insulating body having an adjoining flange that has a metal anchor plate for the purposes of securing to the printed circuit board and transmitting forces. The insulating body with the flange is a single-piece component. The plug connector part with the insulating body is commonly passed through a connection socket on a housing wall. The connection socket is used for connecting an external plug that can be plugged on and fixed by means of a knurled nut. To establish contact between the shield and the printed circuit board via the socket, a shielding plate is used which surrounds the insulating body and which establishes electrical contact between the anchor plate and the printed circuit board. The shielding plate ensures the most extensive possible compensation of installation tolerances and thus uninterrupted contact between the socket on the housing wall and the printed circuit board. At the same time, to achieve good durability with such a shielding plate, there should be the least possible stress between the components. Since the plug part installed on the printed circuit board normally has to be brought together, via the insulating body, with the connection sockets arranged in a housing wall, this connection must compensate for tolerances owing to the tolerance-affected production processes, this normally being achieved by means of a spring element. Said spring element is implemented by a resilient shielding plate.

SUMMARY

In an embodiment, the present invention provides a shielding plate through which a cylindrical insulating body of a plug connector part for installation on a circuit board is passable, the shielding plate comprising: an opening surrounding the insulating body, the shielding plate being configured to be resilient in a direction of an axis of the opening and having angled lugs at opposite edges, wherein each lug of the angled lugs has a first flank and a second flank adjoining the first flank, the first and second flanks each forming an oblique plane and, by way of a zigzag-shaped arrangement as seen in a side view, forming a detent edge which is situated between the first and second flanks and which faces inward toward an other lug.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2E is an enlarged illustration of the shielding plate in the end position:

DETAILED DESCRIPTION

Figure 1:
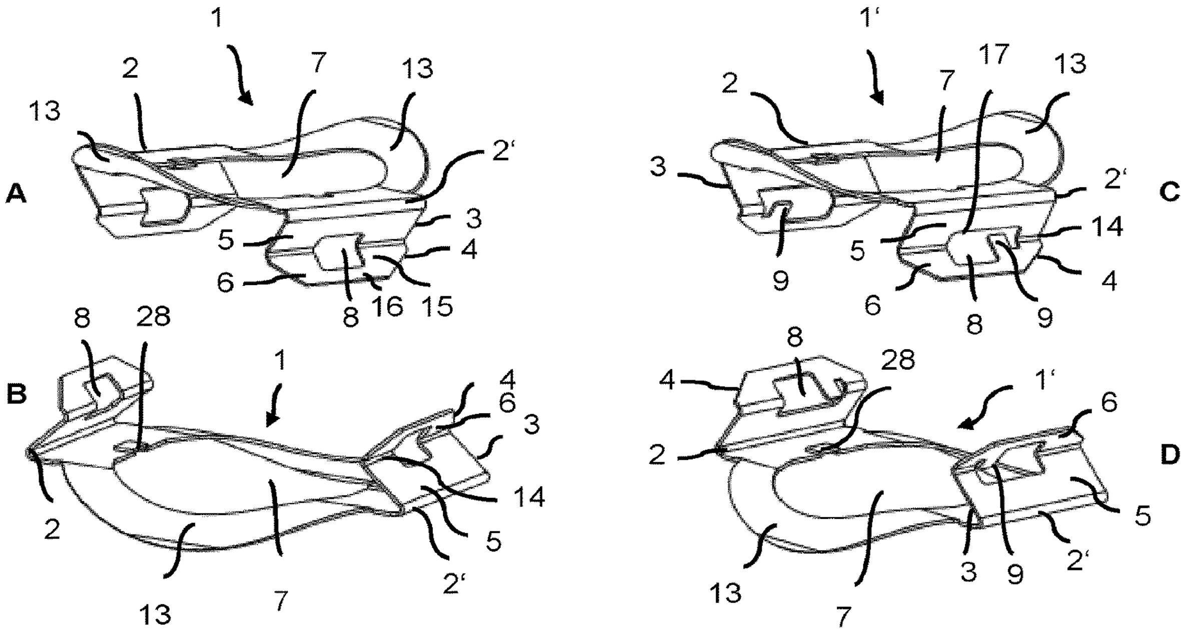
FIG. 1 shows two perspective views of two embodiments of the shielding plate, FIG. 1A showing a first shielding plate in a perspective plan view, FIG. 1B showing the first shielding plate in a perspective view from below, FIG. 1C showing a second shielding plate, with pegs, in a perspective view from above, and FIG. 1D showing the second shielding plate in a perspective view from below.

In an embodiment, the present invention provides a way of improving the processing and installation capability.

Accordingly, the shielding plate according to the invention has specially configured lugs, wherein each lug has a first flank and a second flank adjoining said first flank, said flanks both forming an oblique plane/surface and, by way of the zigzag-shaped arrangement as seen in a side view, forming a detent edge which is situated between the flanks and faces inward toward the other lug. The effect of this configuration of the shielding plate having the lateral lugs that include an inwardly pointing detent edge is that the joining direction and force are oriented exclusively from above, and retroactive attachment of the shielding plate is possible. Accordingly, in an assembly manufacturing process, the shielding plate can be fitted onto the plug connector part in the final operation. Furthermore, a play-free system is guaranteed in order to ensure correct positioning during the installation process, which is important for the best possible volume resistivity of the contact points. A further aspect is protection during transport or safety in transport, even in the event of maloperation. The shielding plate according to the invention can be pushed over the insulating body of the plug connector part from above, wherein, owing to the second oblique plane, the lug can be caused to expand by an abutment surface on the flange, and can automatically snap back into a detent position after a dead center has been overcome. A play-free system is likewise realized by way of automatic readjustment/adduction of the resilient lugs. The detent edge may be continuous or interrupted, such that one or more detent points are realized.

According to a further embodiment, in the flanks, a central opening which encompasses the detent edge is provided, whereby two lateral webs are formed which are connected to one another at the free end of the lug via a transverse web in the second flank. A shielding plate configured in this way having the resilient lugs requires less material, and the resilient characteristic of the lugs during the installation process is improved. Furthermore, this configuration ensures improved positioning of the shielding plate and of the detent edges.

In order, during the transport of a plug connector part having a shielding plate already mounted thereon, the resilient lugs of which are latched with the flange of the plug connector part, to prevent from being detached owing to maloperation and possibly falling out of the plug part entirely, according to a particularly preferred embodiment a peg is provided which lies in the second plane, extends away from the transverse web into the second flange and projects into the opening and beyond the detent edge. Said peg serves as a barbed hook in a corresponding depression in a detent receptacle on the flange of the plug connector part in the event of unintentional detachment. For this purpose, the peg advantageously projects only slightly beyond the detent edge. “Slightly” is to be understood to mean that the length of said peg is adapted to the depression and does not fully utilize the available free space.

The action of the pegs is further improved by virtue of the pegs being arranged diagonally with respect to one another in both openings, that is to say not being situated exactly opposite one another. The shielding plate is thus configured in a rotationally symmetrical manner about the opening.

The particular advantage of the configuration of this shielding plate arises in conjunction with the plug connector part, which has detent receptacles arranged on two opposite sides on the flange, into which detent receptacles the detent edge of the relevant lug engages. The detent receptacles are expediently formed as a depression on the flange, such that the detent edges of the lugs engage in each case on an upper and on a lower edge of the depression. Here, only one depression with one detent edge, or multiple detent edges with multiple depressions, may be provided depending on the above-stated configuration of the lug (with or without a central opening) of the shielding plate. With this configuration, however, it is possible for the shielding plate to become detached.

To prevent this, the peg on the shielding plate expediently projects into the depression and has such a length that, in the depression, said peg does not make contact with an upper wall, adjoining the upper edge, of the depression when the two flanks are bearing against the upper and lower edges of the depression, and said peg is supported, so as to act as a barbed hook, on the upper wall when the shielding plate is moved away from the metal anchor plate in an axial direction of the insulating body.

According to a further preferred embodiment of the plug connector part, the detent receptacle has a vertical web and depressions to both sides, such that the web engages in the central opening in the lug of the shielding plate, and the detent edges of the lateral webs enter the depressions. Good positioning of the shielding plate is thus achieved, which is yet further improved by the peg.

Straightforward installation from only one joining direction remains possible owing to the oblique planes/surfaces on the shielding plate. It is furthermore ensured by way of the oblique plane that the shielding plate is automatically pulled into the correct position on the flange. Owing to the peg that acts as a barbed hook, the seating of the shielding plate is maintained even under adverse transport conditions or in the event of improper handling, and the inherent play of the pegs is directly compensated for again by the relevant oblique plane upon relief of load. The diagonally arranged geometry of the pegs affords the maximum protection in all directions during transport by way of the pegs, and accurate positioning with the least possible play owing to the oblique planes. A further advantage is as a result of defined contact points, installation and disassembly at any point in time, undesired disassembly owing to two pegs and the flat construction in the installed state.

FIG. 1 shows the basic variant of a shielding plate 1 in FIGS. 1A and 1B, and an expanded variant of a shielding plate 1' having an additional peg 9 in FIGS. 1C and 1D. Both the shielding plate 1 and the shielding plate 1' have a central opening 7 through which an insulating body 11 (FIG. 2) can be passed. On the top side, the shielding plate 1, 1' is not planar but is of resilient form. For this purpose, in the exemplary embodiment, said shielding plate has two oppositely situated resilient wings 13 that protrude out of the surface and are pushed downward in the final installation position. The shielding plate 1, 1' has a longitudinal direction and a transverse direction, the resilient wings 13 being arranged in the transverse direction, whereas bent lugs 2, 2' are situated at the two opposite ends in the longitudinal direction. The lugs 2, 2' each have a first flank 3 and a second flank 4, angled with respect to said first flank, resulting in a zigzag-shaped arrangement as seen in a side view. The first flank 3 and the second flank 4 thus form a first oblique plane/surface 5 and a second oblique plane/surface 6. Between the first flank 3 and the second flank 4, the angled configuration gives rise to a detent edge 14 that points inward in the direction of the oppositely situated lug 2, 2'. Arranged in the lug 2, 2' is a central opening 8 that extends from the first flank 3 to the second flank 4. This gives rise to lateral webs 15 to the right and to the left of the central opening 8, and a transverse web 16 at the free end of the lugs 2, 2'. In the expanded embodiment of the shielding plate 1', there is a peg 9 which projects from the transverse web 16 into the opening 8 and which lies in the plane 6 of the second flank 4. The peg 9 projects slightly beyond the detent edge 14, but in terms of its length said peg does not reach the level of the top edge 17 of the opening 8. The shielding plate 1, 1' is configured in a rotationally symmetrical manner about the opening 7, such that the pegs 8 are arranged in the lugs 2, 2' in the shielding plate 1' not opposite one another but so as to diagonally face one another. The surface 28 is used for establishing electrical contact with an anchor plate 26 in FIG. 2.

Figure 2:
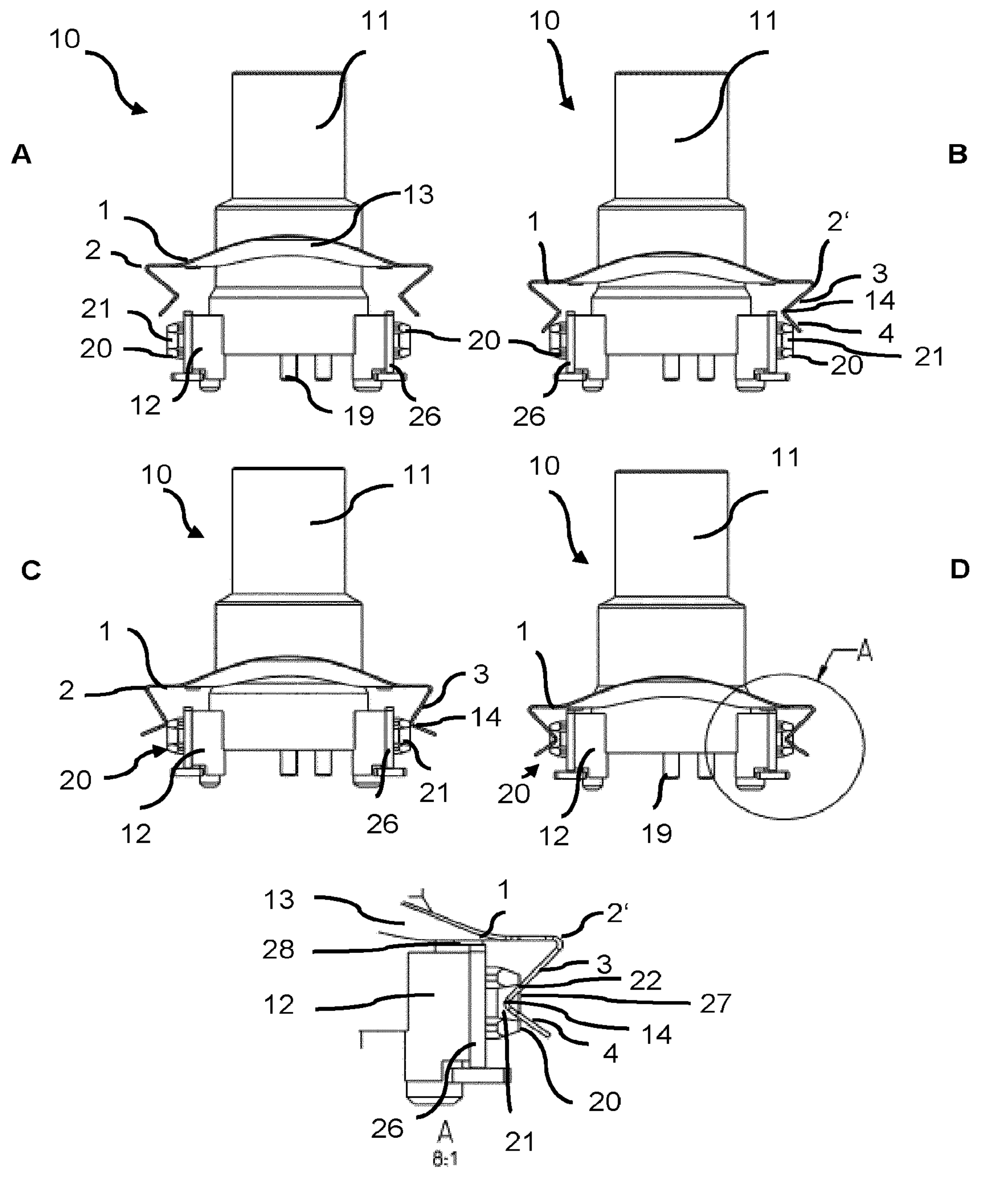
FIG. 2 diagrammatically shows, in FIG. A to D, the steps of installing a first shielding plate according to FIGS. 1A and 1B.

FIG. 2 shows a plug connector part 10 having an insulating body 11 that has a flange 12 having oppositely arranged anchor plates 26, by means of which the plug connector part 11 is secured to a printed circuit board 18. The insulating body 11 and flange 12 are formed as one piece. The downwardly protruding contact pins 19 and the anchor plates 26 are soldered onto the printed circuit board 18. The flange 12 has, on its opposite sides, detent receptacles 20 having depressions 21 into which the detent edge 14 of the shielding plate 1, 1' engages in the end position. FIG. 2A shows the shielding plate 1, through the opening 7 of which an insulating body 11 has been passed. In FIG. 2B, the shielding plate 1 bears, by way of the second flank 4, against the top edge of the detent receptacles 20. Owing to the oblique surface 6 of the second flank 4, the lugs 2, 2' are bent apart outwardly (FIG. 2C) in order to then latch, by way of the detent edge 14, into the depressions 21 (FIG. 2D) in the end position. The detent edge 14 situated in a depression 21 can be seen from the enlarged illustration in FIG. 2E. The first flank 3 and the second flank 4 bear, by way of their oblique surface 5 and 6, respectively, against the edge 22 of the depression 21.

Figure 3:
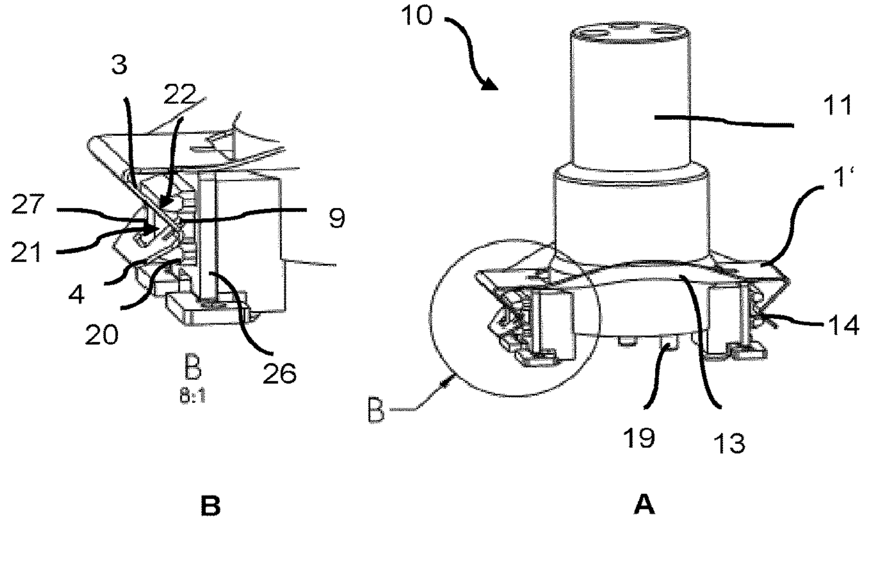
FIG. 3 shows the installed end position of the second variant of the shielding plate according to FIGS. 1C and 1D in FIG. A, and FIG. B is an enlarged perspective illustration of the installed shielding plate.

FIG. 3 illustrates the shielding plate 1', with a corresponding enlarged detail, in FIG. 3A and in FIG. 3B. Here, too, FIG. 3B shows the planes 5 and 6 bearing against the edge 22 of the depression 21 and shows the detent edge 14 projecting into the depression 21, with the peg 9 protruding from the transverse web 16, said peg in this position being spaced apart from the upper wall 23 of the depression 21. The anchor plate 26 has a central recess through which the detent receptacle 20 projects, and makes electrical contact, on the top side, with the shielding plate 1' or shielding plate 1 in the end position.

Figure 4:
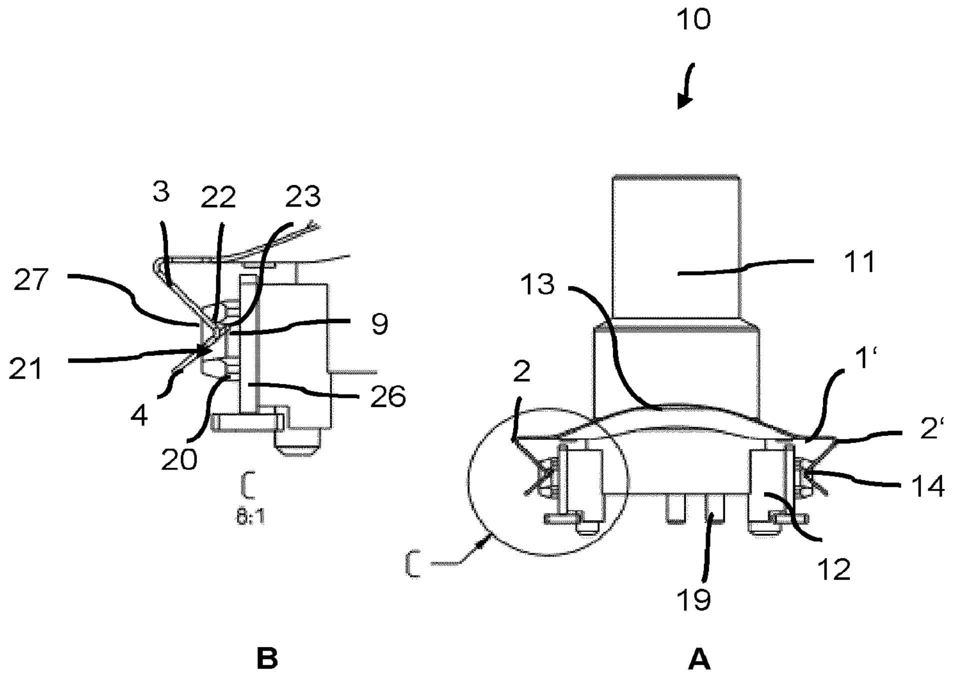
FIG. 4 illustrates the shielding plate in the event of load being exerted on the shielding plate in an upward axial direction by lifting, with an overall illustration in FIG. A and an enlarged side view in FIG. B.

FIG. 4 shows, in 4A and 4B, an instance of maloperation in which the shielding plate 1' is pulled upward. To prevent the shielding plate 1' from sliding out of the depression, which is possible in the case of the variant of the shielding plate 1, the peg 8 is provided. As can be seen in particular in FIG. 4B, said peg acts as a barbed hook and abuts the upper wall 23. This prevents the detent edge 14 from sliding out of the depression 21.

Figure 5:
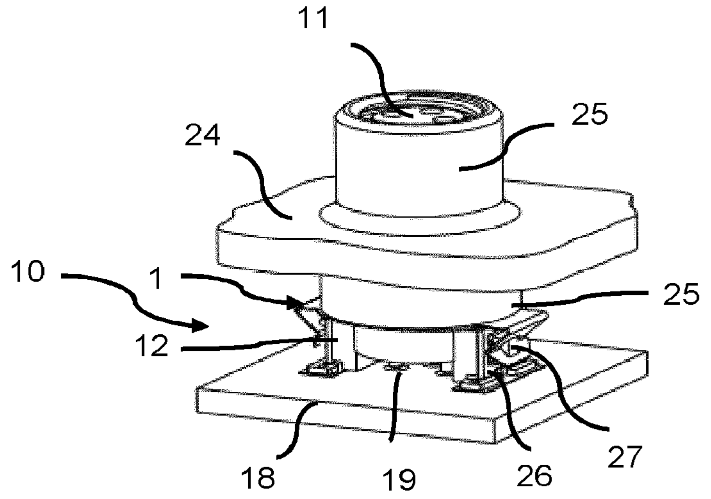
FIG. 5 illustrates an end position of a housing and of a printed circuit board, in which the shielding plate is held only by the installation situation.

Lastly, FIG. 5 shows the plug connector part 10 which, with the insulating body 11, has been inserted through a socket 25, arranged on a housing wall 24, for connecting a plug. The socket 25 pushes, by way of its lower end, against the shielding plate 1, 1' and holds it firmly in the mounted state. The peg 9 shown in FIG. 4 and FIG. 1 is thus no longer required as a securing means during transport or as a means for protecting against maloperation. In the mounted state, the shielding plate 1, 1' has a flat form, and disassembly is possible at any time, with undesired disassembly being prevented by the two pegs 9 in the case of the shielding plate 1'.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A plug connector part, comprising:

an insulating body having plug contacts for electrical connection to a further plug connector part;

a shielding plate through which a cylindrical insulating body of the plug connector part for installation on a circuit board is passable, the shielding plate comprising an opening surrounding the insulating body, the shielding plate being configured to be resilient in a direction of an axis of the opening and having angled lugs at opposite edges; and a securing flange which adjoins the insulating body and which has oppositely arranged anchor plates for attaching to a printed circuit board, wherein, on two opposite sides of the securing flange, there are arranged detent receptacles into which the detent edge of a corresponding lug latches, and wherein each lug of the angled lugs of the shielding plate has a first flank and a second flank adjoining the first flank, the first and second flanks each forming an oblique plane and, by way of a zigzag-shaped arrangement as seen in a side view, forming a detent edge which is situated between the first and second flanks and which faces inward toward an other lug.

2. The plug connector part of claim 1, wherein each flank has a central opening that encompasses the detent edge, whereby two lateral webs are formed which are connected to one another at a free end of the lug via a transverse web in the second flank.

3. The plug connector part of claim 2, wherein a peg that lies in a second plane projects from the transverse web in the second flank into the opening and beyond the detent edge.

4. The plug connector part of claim 3, wherein the peg projects only slightly beyond the detent edge.

5. The plug connector part of claim 3, wherein each peg is arranged diagonally with respect to one another in both openings.

6. The plug connector part of claim 1, wherein the detent edge of the corresponding lug engages in each case in at least one depression of a corresponding detent receptacle, the at least one depression having at least an upper edge and a lower edge.

7. The plug connector part of claim 6, wherein the peg projects into the at least one depression and has such a length that, in the at least one depression, the peg does not make contact with an upper wall, adjoining the upper edge, of the at least one depression when the two flanks are bearing against an edge of the at least one depression, and is supported so as to act as a barbed hook on the upper wall when the shielding plate is moved away from the anchor plate in an axial direction of the insulating body.

8. The plug connector part of claim 7, wherein anchor plate comprises metal.

9. The plug connector part of claim 1, wherein the detent receptacle has a vertical web and has a depression to both sides.

10. A shielding plate through which a cylindrical insulating body of a plug connector part for installation on a circuit board is passable, the shielding plate comprising:

an opening surrounding the insulating body, the shielding plate being configured to be resilient in a direction of an axis of the opening and having angled lugs at opposite edges, wherein each lug of the angled lugs has a first flank and a second flank adjoining the first flank, the first and second flanks each forming an oblique plane and, by way of a zigzag-shaped arrangement as seen in a side view, forming a detent edge which is situated between the first and second flanks and which faces inward toward an other lug, wherein each flank has a central opening that encompasses the detent edge, whereby two lateral webs are formed which are connected to one another at a free end of the lug via a transverse web in the second flank.

* * * * *